(12) United States Patent
Singh et al.

(10) Patent No.: US 7,043,582 B2
(45) Date of Patent: May 9, 2006

(54) SELF-NESTING INTERRUPTS

(75) Inventors: Ravi P. Singh, Austin, TX (US);
Thomas Tomazin, Austin, TX (US);
Charles P. Roth, Austin, TX (US);
Jose Fridman, Swampscott, MA (US);
Michael Allen, Austin, TX (US)

(73) Assignees: Intel Corporation, Santa Clara, CA (US); Analog Devices, Inc., Norwood, MA (US)

( * ) Notice: Subject to any disclaimer, the term of this patent is extended or adjusted under 35 U.S.C. 154(b) by 206 days.

(21) Appl. No.: 10/236,856

(22) Filed: Sep. 6, 2002

(65) Prior Publication Data

US 2004/0049621 A1    Mar. 11, 2004

(51) Int. Cl.
*G06F 13/24*    (2006.01)

(52) U.S. Cl. ............... 710/260; 710/264; 710/266; 710/261

(58) Field of Classification Search ........ 710/260–266, 710/240–244
See application file for complete search history.

(56) References Cited

U.S. PATENT DOCUMENTS

| | | | |
|---|---|---|---|
| 4,918,599 A | | 4/1990 | Hashimoto et al. |
| 5,410,715 A | | 4/1995 | Ishimoto et al. |
| 6,108,744 A | * | 8/2000 | Lebee ................. 710/266 |
| 6,738,846 B1 | * | 5/2004 | Slaughter et al. ........ 710/260 |
| 6,760,800 B1 | * | 7/2004 | Roth et al. ............. 710/260 |
| 2002/0116563 A1 | * | 8/2002 | Lever ................. 710/260 |
| 2002/0133676 A1 | * | 9/2002 | Oldfield et al. .......... 711/151 |

FOREIGN PATENT DOCUMENTS

| EP | 0 899 660 | 3/1999 |
|---|---|---|
| EP | 0 955 581 | 11/1999 |

OTHER PUBLICATIONS

Adam Osborne, "Unterbrechungssteuerung", *Einführung in die Mikrocomputer-Technik*, pp. 5-76 to 5-106 & 7-60 to 7-63 (1982).

* cited by examiner

*Primary Examiner*—Rehana Perveen
*Assistant Examiner*—Kim T. Huynh
(74) *Attorney, Agent, or Firm*—Fish & Richardson P.C.

(57) ABSTRACT

A processor may support a self-nesting mode in which an interrupt may preempt another interrupt of the same priority level. The execution of an interrupt service routine (ISR) for an interrupt may be deferred until the ISR for a subsequently received interrupt of the same priority level is completed.

27 Claims, 6 Drawing Sheets

SELF-NESTING INTERRUPTS

BACKGROUND

A programmable microprocessor, such as a digital signal processor, may handle events such as interrupts and exceptions. An interrupt may be an event which changes the normal instruction flow in the processor. An exception may be a software-initiated event which arises when an error is encountered, such as an invalid instruction or bus error.

Interrupts may be nested. For example, a second interrupt (e.g., a nested interrupt) may be received while a first interrupt is still being handled. Thus, at any given time, a number of interrupt service routines may be active. A prioritization scheme may be used to deal with multiple active service routines in an efficient manner.

DETAILED DESCRIPTION

Figure 1:
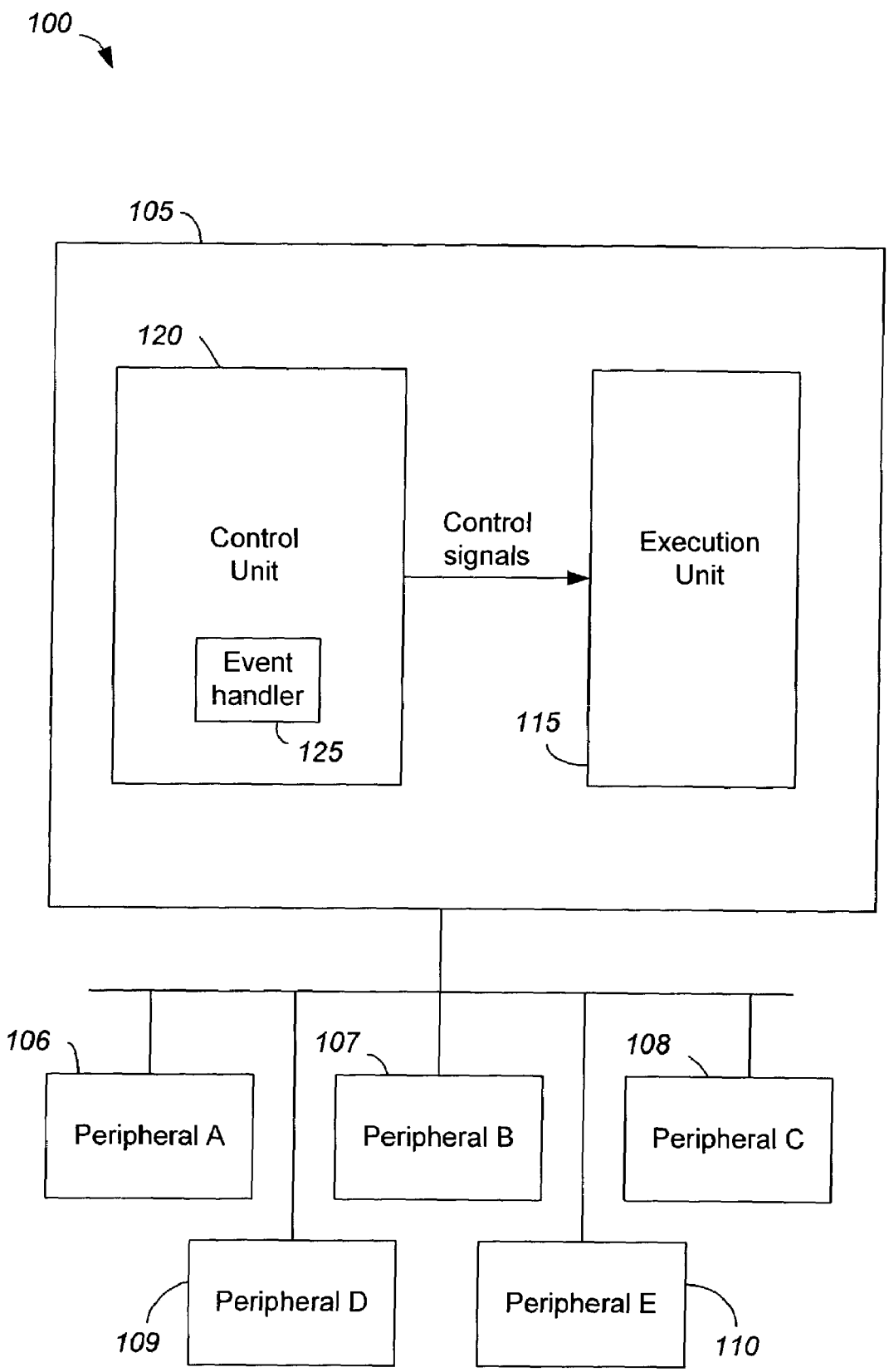
FIG. 1 is a block diagram of a system which supports self-nesting interrupts.

FIG. 1 shows a system 100 including a processor core 105 and a number of peripheral devices 106–110. The core 105 may include an execution unit 115 and a control unit 120.

The execution unit 115 may include an execution pipeline with a number of stages for processing instructions. Each stage may process concurrently with the other stages and pass results to the next stage in the pipeline at each clock cycle. The results of the instructions may emerge at the end of the pipeline in rapid succession.

The control unit 120 may control the flow of instructions and data through the execution unit 115. For example, during the processing of an instruction, the control unit 120 may direct the various components of the execution unit to fetch and decode the instruction, perform the corresponding operation, and write the results back to memory or local registers.

The control unit 120 may include an event handler 125. The event handler may handle events such as interrupts and exceptions. An interrupt may be an event which changes the normal instruction flow in the processor. An exception may be a software-initiated event which arises when an error is encountered, such as an invalid instruction or bus error.

Figure 2:
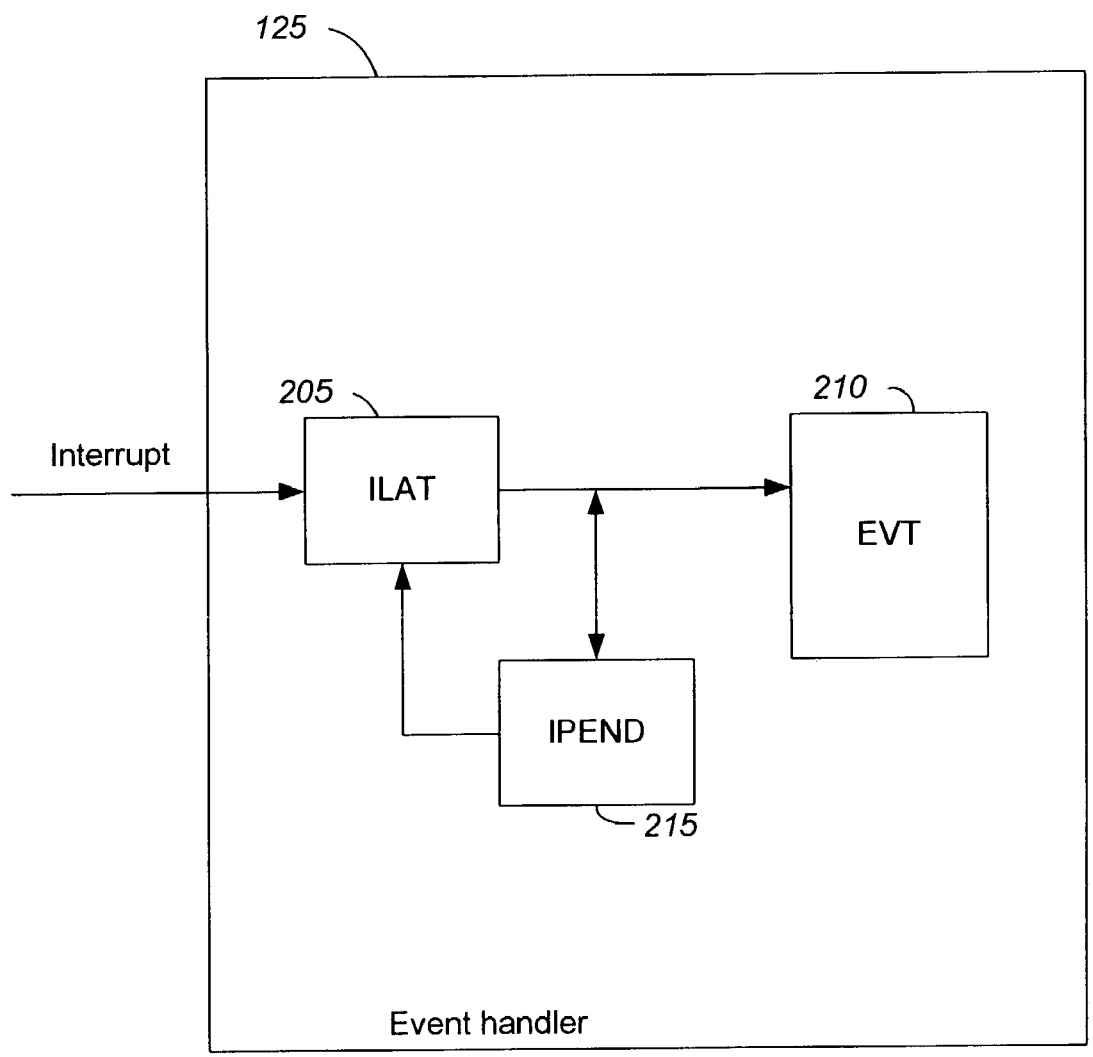
FIG. 2 is a block diagram of an event handler.

FIG. 2 is a block diagram of the event handler 125. The event handler may handle a number of different types of interrupts including system interrupts and general purpose interrupts. The general purpose interrupts may be allocated for interrupts generated by the peripheral devices 106–110. The peripheral devices may include, e.g., memory devices, I/O devices, display screens, speakers, printers, etc.

When a peripheral device generates an interrupt, an interrupt latch register (ILAT) 205 may add the interrupt to a log of interrupts latched by the core but not yet actively being serviced. An event vector table (EVT) 210 may be accessed to look up an appropriate vector for the interrupt's interrupt service routine (ISR). The ISR may include a routine for handling the particular interrupt and end with a return-from-interrupt (RTI) instruction.

When the event vector for the interrupt has entered the execution pipeline, an appropriate bit may be set in an interrupts pending register (IPEND), which may clear the respective ILAT bit. The IPEND may track all pending interrupts, as well as those being presently serviced. When the ISR for the interrupt has been executed, the RTI instruction may clear the appropriate IPEND bit.

Figure 3:
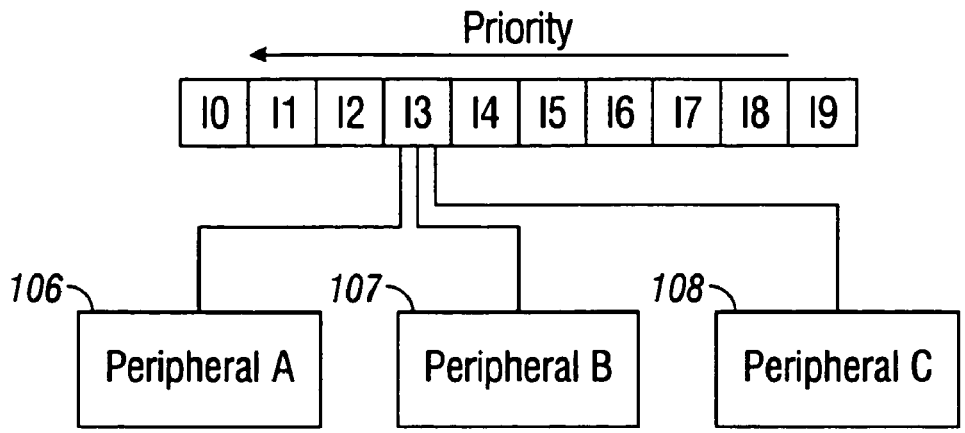
FIG. 3 illustrates an interrupt priority scheme.

The general purpose interrupts may have different priorities. For example, the event handler may support ten general purpose interrupts, e.g., I0 to I9, where I0 has the highest priority and I9 has the lowest priority, as shown in FIG. 3.

The event handler may support nesting of interrupts, in which an interrupt of higher priority may preempt interrupts of lower priority. For example, if an ISR is being executed for interrupt I5 and interrupt I3 is logged, the ISR for I5 may be halted and the ISR for I3 may be initiated. When the ISR for I3 begins execution, the return address to the interrupted point in the ISR for I5 may be saved and subsequently restored when execution of the nested ISR (for I3) has completed.

The event handler 125 may support self-nesting of interrupts, in which one interrupt may preempt another interrupt of the same priority. This may be useful when the number of interrupt-enabled peripheral devices exceeds the number of general purpose interrupts supported by the system. Multiple peripheral devices may be mapped the same interrupt, e.g., peripheral device 106 (A), peripheral device 107 (B), and peripheral device 108 (C), may be mapped to I3, as shown in FIG. 3. Peripheral devices may have different sub-priorities within I3, e.g., peripheral devices 106–108 may be assigned priorities of 0 (highest) to 2 (lowest), respectively. The self-nesting mechanism may insure that no equal-priority-level interrupts are denied service.

Figure 4:
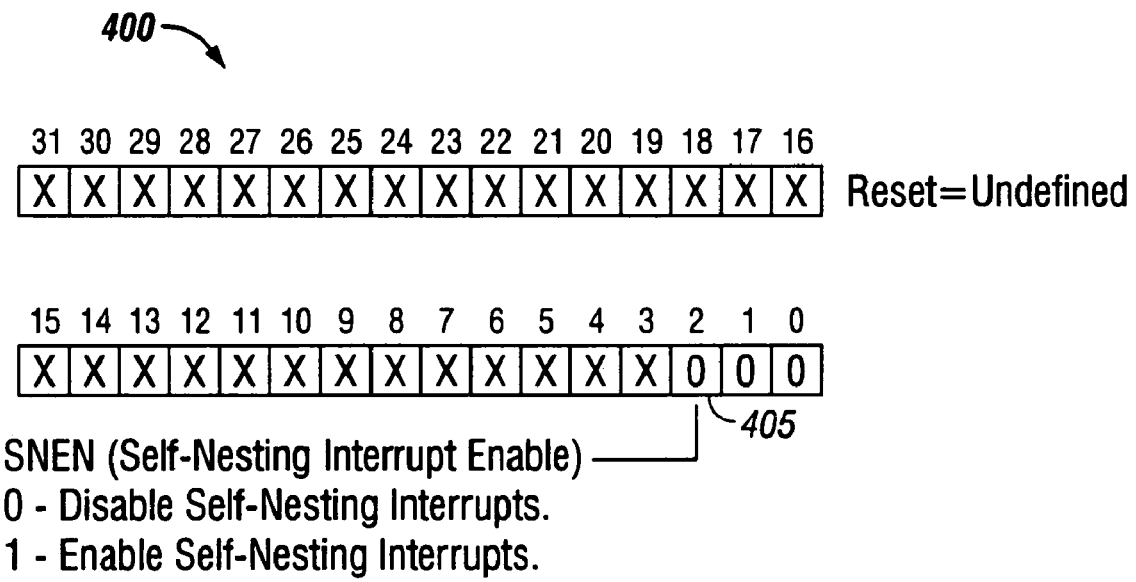
FIG. 4 illustrates a system configuration register (SYSCFG) in the system.

To enable self-nesting, software may set a self-nesting enable bit (SNEN) 405 in a system configuration register (SYSCFG) 400, as shown in FIG. 4. Interrupt addresses in the system may be on even byte boundaries (e.g., be 2-bytes or longer). Thus, the least significant bit (LSB) of an instruction address may typically be 0. In self-nesting mode, the system may set the LSB of the address in a return register (RETI) (e.g., RETI[0]) to indicate that an incoming interrupt has the same priority as an interrupt which is currently being serviced. The bit RETI[0] may automatically set on entry into an interrupt service routine. The bit RETI[0] may be used as a status bit to flag the processor that the current ISR is self-nesting.

Figure 5:
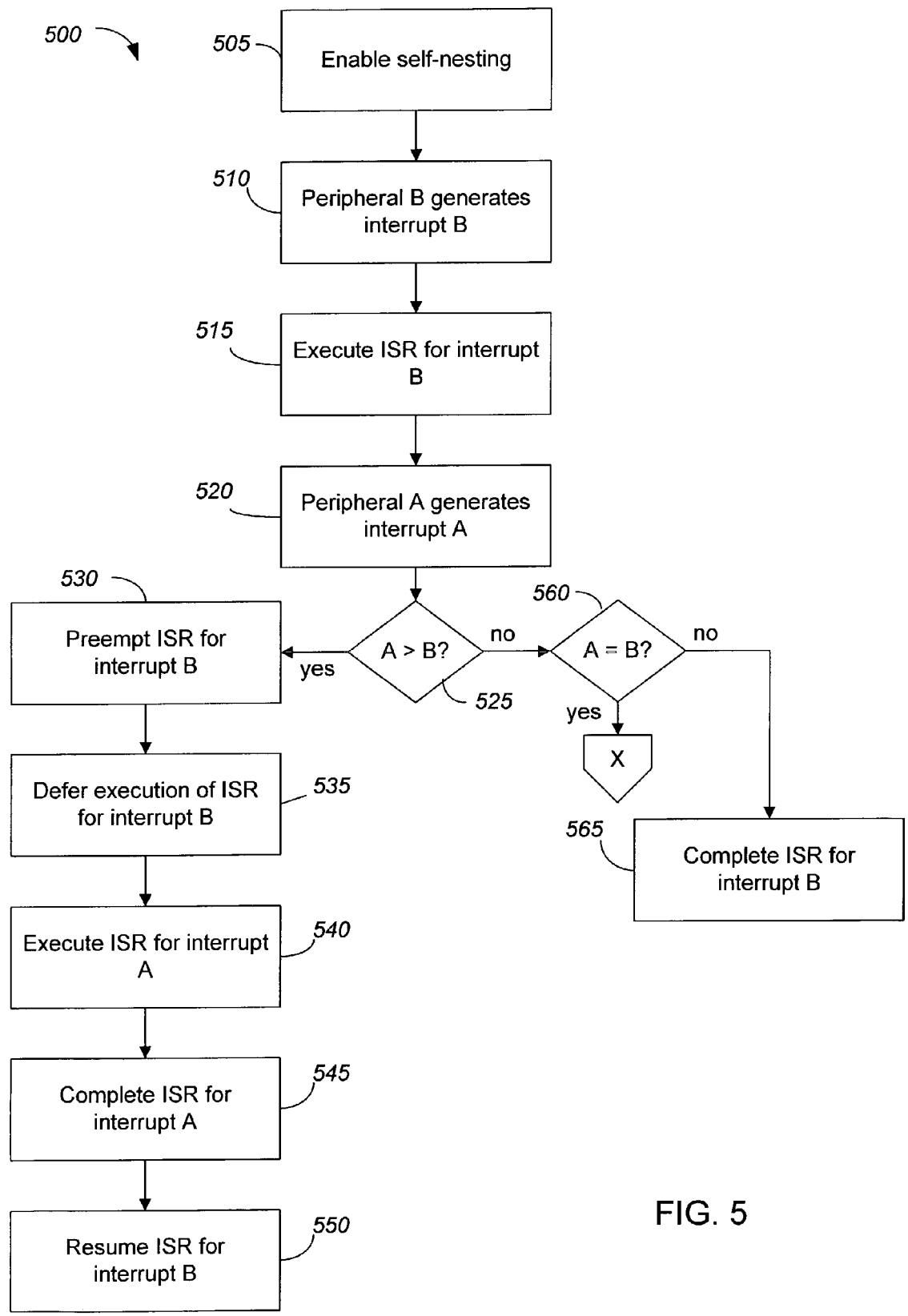
FIGS. 5–7 are flowcharts describing a self-nesting operation.
Figure 6:
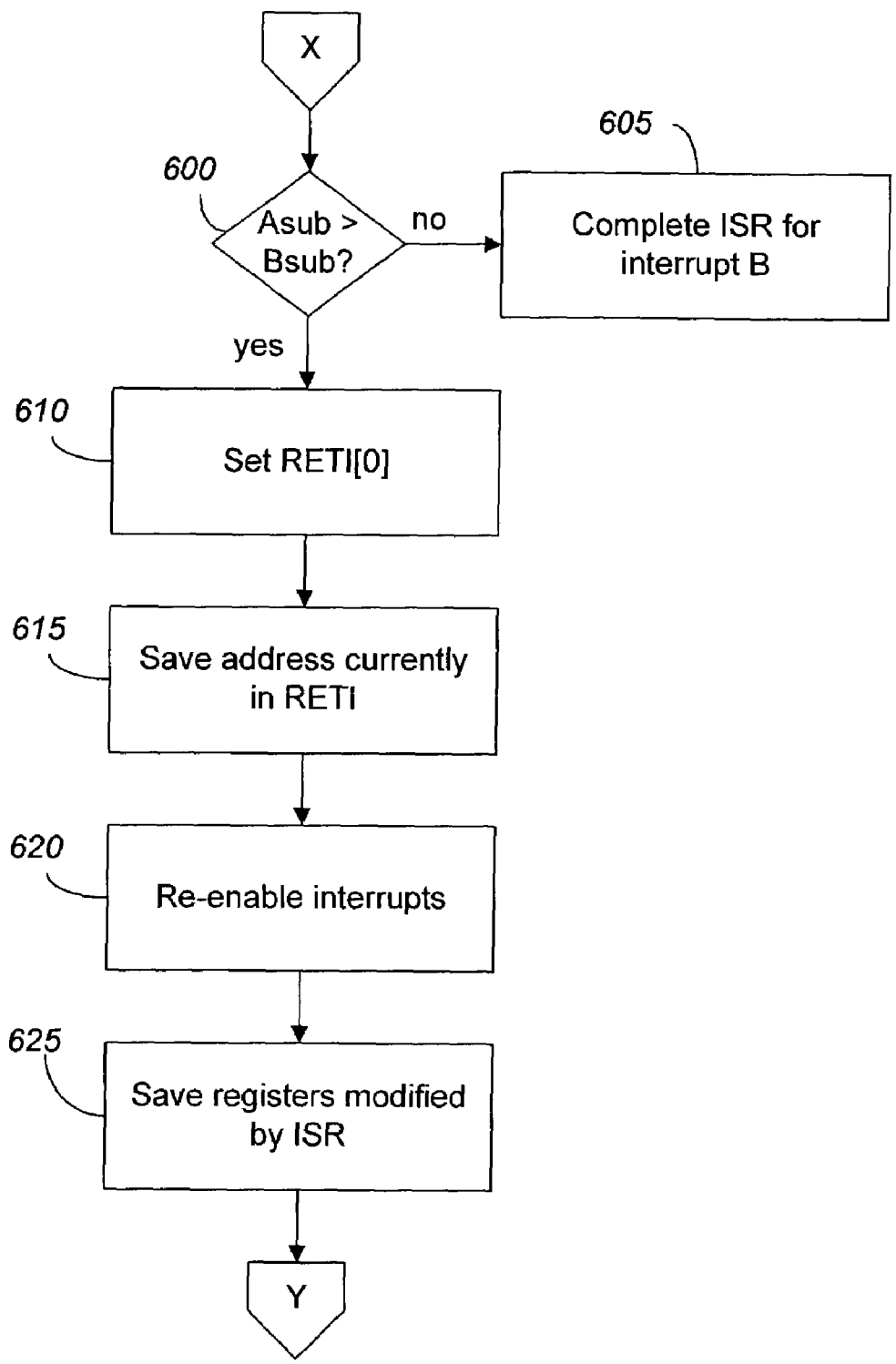
Figure 7:
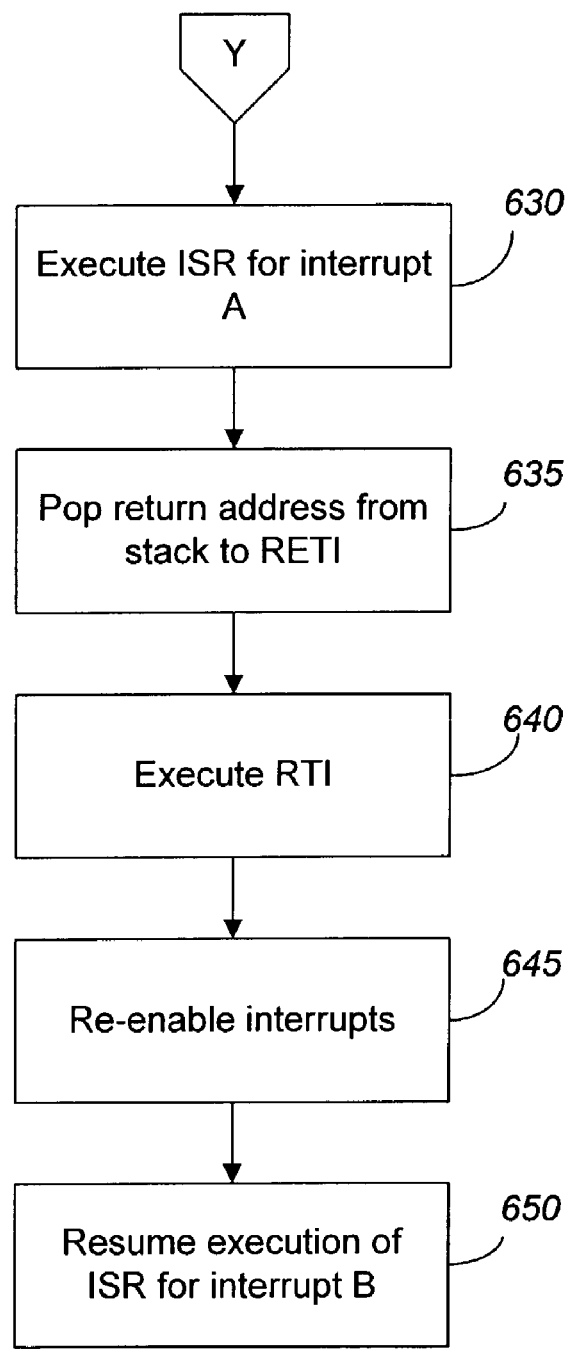

FIGS. 5–7 show a flowchart describing a self-nesting operation 500. The system may set bit SNEN 405 in SYSCFG 400 to enable self-nesting (block 505). A peripheral device B may generate an interrupt B having a priority (block 510). The event handler 125 may receive the interrupt B and begin the execute the ISR for the interrupt B (block 515).

The event handler 125 may receive an interrupt from a peripheral device A after the ISR for the interrupt B enters the execution pipeline (block 520). The event handler 125 may determine whether the interrupt A has a higher priority than interrupt B (block 525). If interrupt A has a higher priority than interrupt B, the event handler 125 may preempt the ISR for interrupt B (block 530) and defer execution of the ISR (block 535). The event handler 125 may execute the ISR for interrupt A (block 540) and, after the ISR completes (block 545), resume execution of the ISR for interrupt B (block 550).

If the priority of interrupt A is not higher than the priority of interrupt B, the event handler 125 may determine whether interrupt B and interrupt A have the same priority level (block 560). If the priority of interrupt A is lower than the priority of interrupt B, the event handler 125 may continue executing the ISR for interrupt B and log interrupt A in the IPEND register (block 565).

If interrupt B and interrupt A have the same priority level, the event handler 125 may determine whether interrupt A has a higher sub-priority level than interrupt B (block 600). If not, the event handler 125 may continue executing the ISR for interrupt B and log interrupt A in the IPEND register (block 605).

If interrupt A has a higher sub-priority level than interrupt B, the event handler 125 may self-nest interrupt A. The event handler 125 may set RETI[0] to indicate that the incoming interrupt has the same priority as the interrupt currently being serviced (block 610). The system may include a dynamic IPEND_R mask, which may exclude the interrupt level of the interrupt being serviced when self-nesting is not enabled, but include the same interrupt priority level when self-nesting is enabled.

The return address currently in RETI may be saved, e.g., by pushing the address to a Supervisor stack (block 615). Interrupts may be suspended while the address is being saved, and re-enabled after the address is saved (block 620). Registers which may be modified by the ISR may also be saved (block 625). The event handler 125 may then locate the vector for the ISR for interrupt A and execute the ISR (block 630).

As the ISR for interrupt A completes, the return address may be popped into RETI from the stack (block 635), which may suspend interrupts from the time RETI is restored until the RTI instruction finishes executing (block 640). The suspension of interrupts may prevent subsequent interrupt from corrupting RETI.

When RTI finishes executing, interrupts may be re-enabled, e.g., by clearing the global disable bit, and the program may jump to the return address. Execution of the ISR for interrupt B may then be resumed (block 650).

In an alternative embodiment, interrupts having the same priority level may not have sub-priorities, and may always self-nest, e.g., an incoming interrupt may always preempt an interrupt of the same priority level being executed.

The RTI instruction may be sensitive to the state of RETI[0] and SNEN. When both RETI[0] and SNEN are set, the RTI instruction may clear only the global disable bit (block 645). However, when self-nesting mode is disabled, RTI may clear both the global disable bit and the IPEND bit which corresponds to the current interrupt level.

A number of embodiments have been described. Nevertheless, it will be understood that various modifications may be made without departing from the spirit and scope of the invention. For example, blocks in the flowcharts may be skipped or performed out of order and still produce desirable results. Accordingly, other embodiments are within the scope of the following claims.

The invention claimed is:

1. A method comprising:
   executing a first interrupt service routine to handle a first interrupt having a general priority and a first sub-priority;
   receiving a second interrupt having the same general priority as the first interrupt, and having a second sub-priority;
   comparing the first sub-priority and the second sub-priority; and
   in response to the first and second interrupt having the same general priority, and to the second sub-priority being higher than the first sub-priority,
   halting execution of the first interrupt service routine; and
   executing a second interrupt service routine to handle the second interrupt.

2. The method of claim 1, further comprising:
   resuming execution of the first interrupt service routine after the second interrupt service routine completes.

3. The method of claim 1, further comprising:
   in response to the first sub-priority being higher than the second sub-priority, executing the second interrupt service routine after the first interrupt service routine completes.

4. An article comprising a machine-readable medium including machine-executable instructions, the instructions operative to cause a machine to:
   execute a first interrupt service routine to handle a first interrupt having a general priority and a first sub-priority;
   receive a second interrupt having the same general priority as the first interrupt, and having a second sub-priority;
   compare the first sub-priority and the second sub-priority; and
   in response to the first and second interrupt having the same general priority, and to the second sub-priority being higher than the first sub-priority,
   halt execution of the first interrupt service routine; and
   execute a second interrupt service routine to handle the second interrupt.

5. The article of claim 4, further comprising instructions operative, to cause the machine to:
   resume execution of the first interrupt service routine after the second interrupt service routine completes.

6. The article of claim 4, further comprising instructions operative to cause the machine to:
   in response to the first sub-priority being higher than the second sub-priority, execute the second interrupt service routine after the first interrupt service routine completes.

7. Apparatus comprising:
   an event handler operative to handle a self-nested interrupt, wherein:
   said self-nested interrupt preempts another interrupt having a same priority level;
   a first source of said self-nested interrupt and a second source of said another interrupt have a shared interrupt request line of the same priority level; and
   said self-nested interrupt and said another interrupt are received from said first and second sources of interrupts on said shared interrupt request line at the event handler.

8. The apparatus of claim 7, wherein the event handler is further operative to defer execution of a first interrupt service routine to handle said self-nested interrupt in response to receiving said another interrupt having the same priority level.

9. The apparatus of claim 8, wherein the event handler is further operative to initiate a second interrupt service routine to handle said self-nested interrupt and resume execution of the first interrupt service routine when the second interrupt service routine completes.

10. The apparatus of claim 8, wherein said another interrupt comprises a first general purpose interrupt and said self-nested interrupt comprises a second general purpose interrupt.

11. The apparatus of claim 10, wherein the first general purpose interrupt and the second general purpose interrupt share a general priority level,
  wherein the first general purpose interrupt has a first sub-priority level, and
  wherein the second general purpose interrupt has a second sub-priority level.

12. The apparatus of claim 11, wherein the event handler defers execution of the first interrupt service routine in response to determining that the second sub-priority level is higher than the first sub-priority level.

13. The apparatus of claim 8, further comprising:
  the first source of said self-nested interrupt, wherein the first source is a peripheral device operative to generate said self-nested interrupt.

14. A method comprising:
  executing a first interrupt service routine to handle a first interrupt having a priority level;
  receiving a second interrupt having the same priority level;
  halting execution of the first interrupt service routine based in part on the second interrupt being a self-nested interrupt, wherein:
    said self-nested interrupt preempts another interrupt having the same priority level,
    a first source of said first interrupt and a second source of said second interrupt have a shared interrupt request line of the same priority level, and
    said first and second interrupts are received from said first and second sources of interrupts on said shared interrupt request line at an event handler; and
  executing a second interrupt service routine to handle the second interrupt.

15. The method of claim 14, further comprising:
  resuming execution of the first interrupt service routine after the second interrupt service routine completes.

16. The method of claim 14, wherein receiving the second interrupt comprises receiving a general purpose interrupt.

17. The method of claim 14, further comprising:
  generating the second interrupt at a peripheral device, wherein the peripheral device is the second source of the second interrupt.

18. The method of claim 14, further comprising:
  receiving a third interrupt having a priority level higher than the priority level of the second interrupt during execution of the second interrupt;
  halting execution of the second interrupt service routine; and
  executing a third interrupt service routine to handle the third interrupt.

19. The method of claim 18, further comprising:
  resuming execution of the second interrupt service routine after the third interrupt service routine completes.

20. The method of claim 14, further comprising:
  receiving a third interrupt having a priority lower than the priority of the first interrupt during execution of the first interrupt service routine;
  logging the third interrupt; and
  executing a third interrupt service routine after the first interrupt service routine completes.

21. A system comprising:
  an execution unit;
  an event handler operative to:
    execute a first interrupt service routine to handle a first interrupt having a priority level;
    receive a second interrupt having the same priority level;
    halt execution of the first interrupt service routine based in part on the second interrupt being a self-nested interrupt, wherein:
      said self-nested interrupt preempts another interrupt having the same priority level,
      a first source of said first interrupt and a second source of said second interrupt have a shared interrupt request line of the same priority level, and
      said first and second interrupts are received from said first and second sources of interrupts on said shared interrupt request line at the event handler; and
    executing a second interrupt service routine to handle the second interrupt.

22. The system of claim 21, wherein the event handler is further operative to resume execution of the first interrupt service routine after the second interrupt service routine completes.

23. The system of claim 21, wherein the event handler operative to receive the second interrupt comprises the event handler operative to receive a general purpose interrupt.

24. The system of claim 21, wherein a peripheral device is operative to generate the second interrupt, the peripheral device being the second source of the second interrupt.

25. The system of claim 21, wherein the event handler is further operative to:
  receive a third interrupt having a priority level higher than the priority level of the second interrupt during execution of the second interrupt;
  halt execution of the second interrupt service routine; and
  execute a third interrupt service routine to handle the third interrupt.

26. The system of claim 25, wherein the event handler is further operative to resume execution of the second interrupt service routine after the third interrupt service routine completes.

27. The system of claim 21, wherein the event handerl is further operative to:
  receive a third interrupt having a priority lower than the priority of the first interrupt during execution of the first interrupt service routine;
  log the third interrupt; and
  execute a third interrupt service routine after the first interrupt service routine completes.

* * * * *